US012650161B2

(12) United States Patent (10) Patent No.: US 12,650,161 B2

Yang et al. (45) Date of Patent: Jun. 9, 2026

(54) DISCONNECTOR APPARATUS WITH LIMITED-SLIP DIFFERENTIAL

(71) Applicant: Hyundai Transys Inc., Seosan-si (KR)

(72) Inventors: Se Dong Yang, Hwaseong-si (KR);
Bong Joo Shin, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 19/036,163

(22) Filed: Jan. 24, 2025

(65) Prior Publication Data

US 2026/0036192 A1 Feb. 5, 2026

(30) Foreign Application Priority Data

Aug. 2, 2024 (KR) ........................ 10-2024-0103294

(51) Int. Cl.
F16H 48/24 (2006.01)
F16H 48/22 (2006.01)

(52) U.S. Cl.
CPC ............. F16H 48/24 (2013.01); F16H 48/22 (2013.01)

(58) Field of Classification Search
CPC ..................... F16H 48/22; F16H 48/24; F16H 2048/02–2048/426; F16D 2001/103; F16D 1/10; F16D 23/02–23/148
See application file for complete search history.

(56) References Cited

U.S. PATENT DOCUMENTS 5,021,038 A * 6/1991 Beigang ................ F16H 48/295
475/85
5,125,876 A 6/1992 Hirota 2018/0326844 A1 * 11/2018 Ekonen ................... F16D 13/46
2020/0063845 A1 2/2020 Balenda, II

FOREIGN PATENT DOCUMENTS

| CN | 201145019 Y | 11/2008 |
|---|---|---|
| DE | 102008063904 A1 | 7/2010 |
| DE | 112022006082 T5 | 10/2024 |
| JP | H11210863 A | 8/1999 |
| JP | 2002-293157 A | 10/2002 |
| JP | 2005-048858 A | 2/2005 |
| JP | 2006-189149 A | 7/2006 |
| JP | 2022-187960 A | 12/2022 |
| KR | 10-2017-0123869 A | 11/2017 |
| KR | 10-2022-0165554 A | 12/2022 |
| KR | 10-2023-0152541 A | 11/2023 |

OTHER PUBLICATIONS

Stollwerck, "Office Action of German patent application No. 102025105209.3", Dec. 23, 2025, DPMA, Germany.

* cited by examiner

*Primary Examiner* — Tinh T Dang
(74) *Attorney, Agent, or Firm* — Bridgeway IP Law Group, PLLC; Jihun Kim

(57) ABSTRACT

A disconnector apparatus with a limited-slip differential includes a casing, a support ring provided in the casing and configured to surround a pinion gear, and a clutch ring connected to a sleeve configured to be operated by an operation of an actuator, the clutch ring being configured such that when the clutch ring moves in an engagement direction when the sleeve is operated by the actuator, a first engagement part, which is provided at one end positioned in the casing, engages with a second engagement part, which is provided on one surface of the support ring, to implement four-wheel drive.

9 Claims, 2 Drawing Sheets

DISCONNECTOR APPARATUS WITH LIMITED-SLIP DIFFERENTIAL

CROSS-REFERENCE TO RELATED APPLICATIONS

This application claims priority to and the benefit of Korean Patent Application No. 10-2024-0103294 filed in the Korean Intellectual Property Office on Aug. 2, 2024, the entire contents of which are incorporated herein by reference.

TECHNICAL FIELD

The present invention relates to a disconnector apparatus with a limited-slip differential.

BACKGROUND ART

In general, a disconnector apparatus refers to an apparatus capable of minimizing an unnecessary loss of power by switching power between two-wheel drive (2WD) and four-wheel drive (4WD) depending on a traveling situation.

A limited slip differential (LSD) refers to a device for restricting differential by using friction or the like when relative rotational motions occur on left and right driving wheels.

The limited slip differential (LSD) may allow one side driving wheel to easily get out of a muddy road or puddle by transmitting a force to the other side driving wheel when one side driving wheel gets stuck in the muddy road or puddle. Further, the limited slip differential (LSD) prevents a slip of the wheel when a vehicle travels in corners, thereby ensuring traveling safety.

However, a device, in which a disconnector function and a limited-slip differential function are integrated, has not been developed.

DOCUMENT OF RELATED ART

Patent Document (Patent Document 1) Korean Patent Application Laid-Open No. 10-2017-0123869 (Nov. 9, 2017)

SUMMARY OF THE INVENTION

The present invention has been made in an effort to solve the above-mentioned problem, and an object of the present invention is to provide a disconnector apparatus with a limited-slip differential, in which a first engagement part of a clutch ring and a second engagement part of a support ring engage with each other to implement a four-wheel drive state, and one side gear part is tightly attached to a first friction member or the other side gear is tightly attached to a second friction member to implement a limited differential state.

In order to achieve the above-mentioned object, the present invention provides a disconnector apparatus with a limited-slip differential, the disconnector apparatus including a casing, a support ring provided in the casing and configured to surround a pinion gear, and a clutch ring connected to a sleeve configured to be operated by an operation of an actuator, the clutch ring being configured such that when the clutch ring moves in an engagement direction when the sleeve is operated by the actuator, a first engagement part, which is provided at one end positioned in the casing, engages with a second engagement part, which is provided on one surface of the support ring, to implement four-wheel drive.

In addition, one side gear part and the other side gear part may be provided at two opposite sides of the pinion gear, a gear portion, which is configured to engage with the pinion gear, may be provided on one surface of one side gear part directed toward the pinion gear, a gear portion, which is configured to engage with the pinion gear, may be provided on one surface of the other side gear part directed toward the pinion gear, one side shaft portion may extend from the other surface of one side gear part, and the other side shaft portion may extend from the other surface of the other side gear part.

In addition, the disconnector apparatus may include: a first friction member coupled to an outer-diameter portion of one side shaft portion so as to be positioned between one side gear part and the casing; and a second friction member coupled to an outer-diameter portion of the other side shaft portion so as to be positioned between the other side gear part and the casing.

The first friction member and the second friction member may each be configured as a multi-plate clutch.

In addition, when a vehicle travels on a rough road in a four-wheel drive traveling state in which the first engagement part and the second engagement part engage with each other, the other surface of one side gear part may be tightly attached to the first friction member or the other surface of the other side gear part may be tightly attached to the second friction member, such that a limited differential state is implemented.

In addition, the sleeve may be coupled to an outer-diameter portion of the casing and connected to the actuator, and the first engagement part may engage with the second engagement part of the support ring when the clutch ring connected to the sleeve is moved in the engagement direction by the operation of the actuator.

In addition, the first engagement part and the second engagement part may each be configured as a dog clutch.

In addition, the first engagement part may be provided on one surface of a ring member directed toward the second engagement part, and the ring member may be attachable to or detachable from the clutch ring.

In addition, the ring member may be coupled to the clutch ring by a coupling member, and the coupling member may penetrate one end of the clutch ring and be screw-coupled to the ring member.

In addition, the clutch ring may include: one end positioned in the casing while penetrating the casing; the other end coupled to an outer-diameter portion of the casing so as to be positioned outside the casing; and a stepped portion provided on an inner-diameter portion of the other end and configured to restrict a movement of the clutch ring by being caught by a catching projection provided on the outer-diameter portion of the casing.

According to the present invention, the power switching may be performed from the two-wheel drive (2WD) to the four-wheel drive (4WD).

In addition, according to the present invention, when the vehicle travels on a corner, a rainy road, or a snowy road, in the four-wheel drive state, one side gear part may be tightly attached to the first friction member, and the other side gear part may be tightly attached to the second friction member, such that the limited differential state may be implemented.

In addition, according to the present invention, the disconnector function may improve electric power economy of the electric vehicle and perform the limited slip differential function when the vehicle turns at a high speed by applying the multi-plate clutch limited slip differential (mLSD), thereby ensuring traveling stability.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
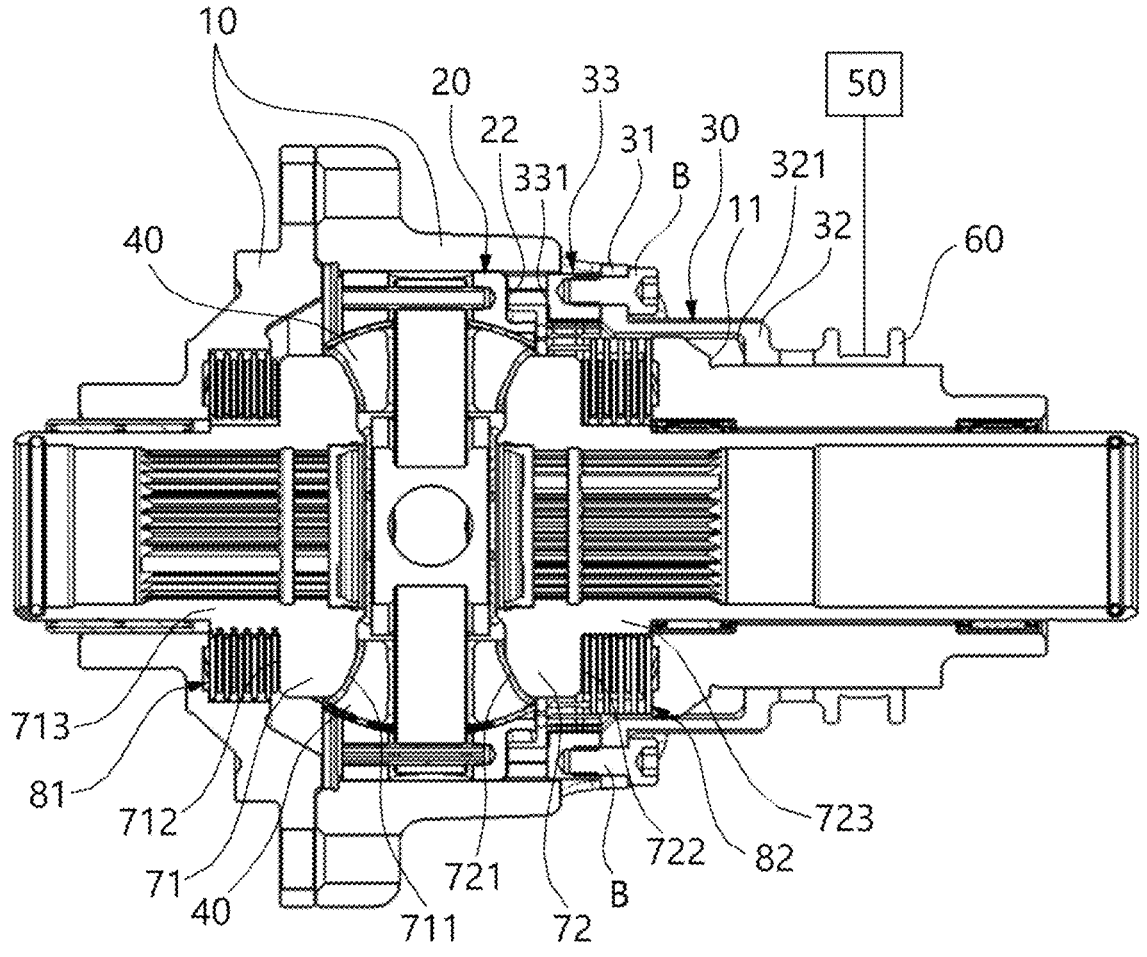
FIG. 1 is a view illustrating an operation in a two-wheel drive mode according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
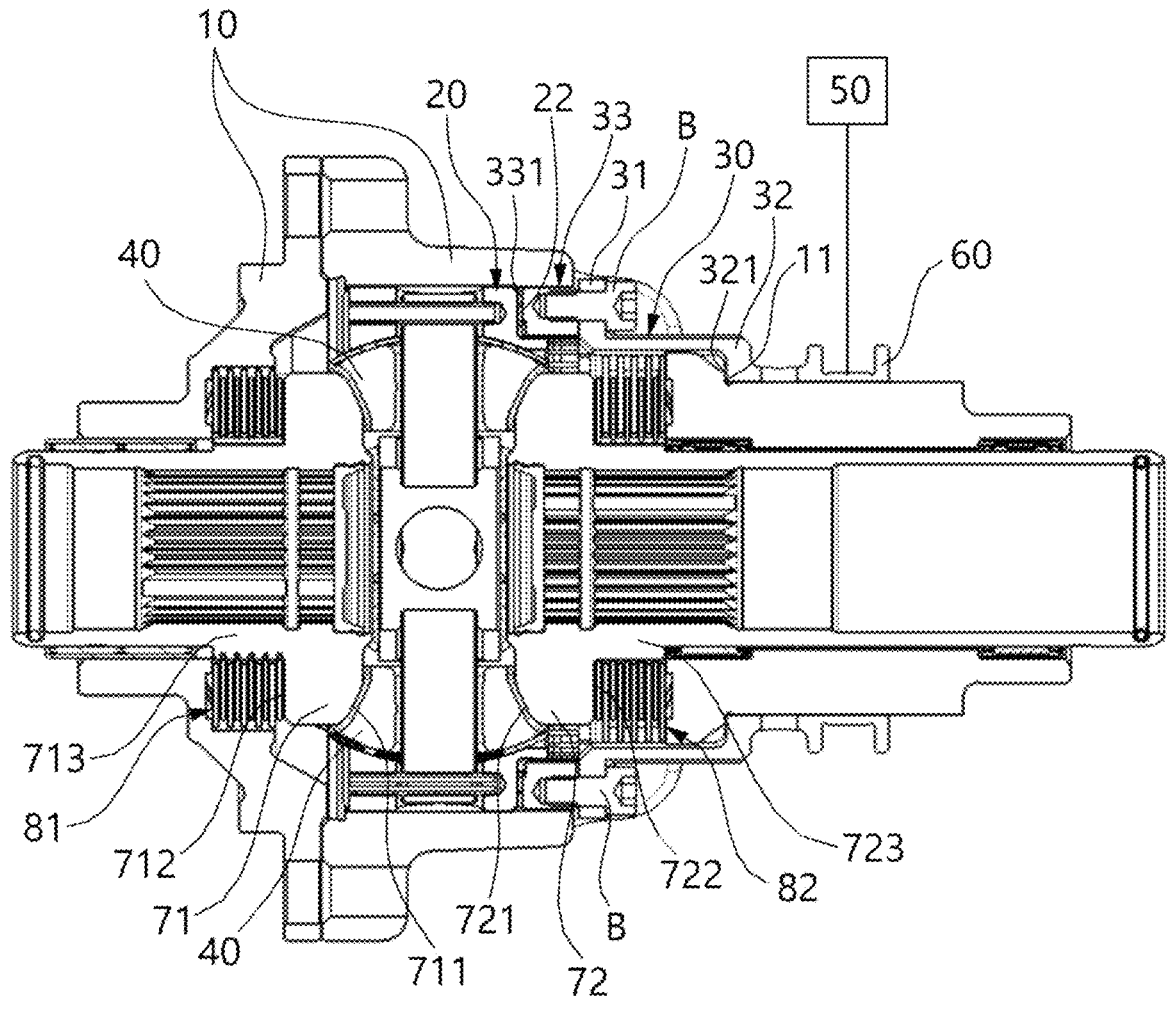
FIG. 2 is a view illustrating an operation in a four-wheel drive mode according to the exemplary embodiment of the present invention.

FIG. 1 is a view illustrating an operation in a two-wheel drive mode according to an exemplary embodiment of the present invention, and FIG. 2 is a view illustrating an operation in a four-wheel drive mode according to the exemplary embodiment of the present invention.

As illustrated in FIGS. 1 and 2, a disconnector apparatus of the present invention may include a casing 10, a support ring 20 mounted in the casing 10, and a clutch ring 30 configured to perform an engagement operation.

A first engagement part 331 may be provided at one end 31 of the clutch ring 30. The first engagement part 331 may be configured as a dog clutch.

The support ring 20 may be provided in the casing 10 and configured to surround a pinion gear 40. A second engagement part 22 may be provided on one surface of the support ring 20 directed toward the clutch ring 30. The second engagement part 22 may be configured as a dog clutch that conforms to the first engagement part 331.

One side gear part 71 and the other side gear part 72 may be provided at two opposite sides of the pinion gear 40. A gear portion 711, which is configured to engage with the pinion gear 40, may be provided on one surface of one side gear part 71 directed toward the pinion gear 40. A gear portion 721, which is configured to engage with the pinion gear 40, may be provided on one surface of the other side gear part 72 directed toward the pinion gear 40.

One side shaft portion 713 may be integrated with one side gear part 71. One side shaft portion 713 may extend from the other surface 712 of one side gear part 71.

The other side shaft portion 723 may be integrated with the other side gear part 72. The other side shaft portion 723 may extend from the other surface 722 of the other side gear part 72.

A first friction member 81 may be provided between one side gear part 71 and the casing 10. The first friction member 81 may be coupled to an outer-diameter portion of one side shaft portion 713.

A second friction member 82 may be provided between the other side gear part 72 and the casing 10. The second friction member 82 may be coupled to an outer-diameter portion of the other side shaft portion 723.

The first friction member 81 and the second friction member 82 may each be configured as a multi-plate clutch. The multi-plate clutches may be applied to all types of vehicles by adjusting the number of multi-plate clutches.

In a four-wheel drive traveling state, the other surface 712 of one side gear part 71 is tightly attached to the first friction member 81 or the other surface 722 of the other side gear part 72 is tightly attached to the second friction member 82, such that a limited differential state may be implemented.

The first engagement part 331 may be provided on one surface of a ring member 33 directed toward the second engagement part 22. The ring member 33 may be integrated with the clutch ring 30. However, the ring member 33 may be configured to be attachable to or detachable from the clutch ring 30.

The ring member 33 may be coupled to one end 31 of the clutch ring 30 by a coupling member B such as a bolt. The coupling member B may penetrate one end 31 of the clutch ring 30 and be screw-coupled to the ring member 33.

For example, in case that the ring member 33 is integrated with the clutch ring 30, the entire clutch ring 30 needs to be replaced when the first engagement part 331 is damaged. However, in case that the ring member 33 is structured to be attachable to or detachable from the clutch ring 30, the ring member 33 with the damaged first engagement part 331 may be separated from the clutch ring 30 and replaced with a new ring member 33 when the first engagement part 331 is damaged.

One end 31 of the clutch ring 30 may penetrate the casing 10 and be positioned in the casing 10. The other end 32 of the clutch ring 30 may be positioned outside the casing 10. The other end 32 of the clutch ring 30 may be coupled to an outer-diameter portion of the casing 10.

A stepped portion 321 may be provided on an inner-diameter portion of the other end 32 of the clutch ring 30. The stepped portion 321 may be caught by a catching projection 11 provided on the outer-diameter portion of the casing 10. When the stepped portion 321 is caught by the catching projection 11, a movement of the clutch ring 30 in an engagement direction may be restricted.

A sleeve 60 may be connected to an actuator 50 by a connection member such as a fork (not illustrated). The sleeve 60 may be moved by an operation of the actuator 50. When the sleeve 60 moves, the clutch ring 30 connected to the sleeve 60 may move in the engagement direction.

Next, an operation in a four-wheel drive mode of the present invention will be described.

In a two-wheel drive state illustrated in FIG. 1 in which the first engagement part 331 is spaced apart from the second engagement part 22, the sleeve 60 may be moved in the engagement direction by the operation of the actuator 50, as illustrated in FIG. 2.

When the sleeve 60 moves in the engagement direction, the clutch ring 30 connected to the sleeve 60 may move in the engagement direction.

The first engagement part 331 may engage with the second engagement part 22 of the support ring 20 while the clutch ring 30 moves in the engagement direction. In the state in which the first engagement part 331 engages with the second engagement part 22, the stepped portion 321 of the clutch ring 30 is caught by the catching projection 11 of the casing 10, such that the movement of the clutch ring 30 may be restricted.

When the first engagement part 331 engages with the second engagement part 22, a four-wheel drive state may be implemented.

For example, in the four-wheel drive state, power of a drive motor (not illustrated) may be transmitted to the casing 10 through a ring gear (not illustrated) coupled to an outer side of the casing 10.

Meanwhile, the limited differential state is not implemented when the vehicle travels in the two-wheel drive mode in which the first engagement part 331 and the second engagement part 22 are disengaged. The two-wheel drive may further reduce electric power consumption (fuel consumption) in comparison with the four-wheel drive.

Next, the operation of limiting the differential of the present invention will be described.

As illustrated in FIG. 2, an axial force of one side gear part 71 and an axial force of the other side gear part 72 may be generated while the vehicle travels in the four-wheel drive state in which the first engagement part 331 and the second engagement part 22 engage with each other.

By the axial force of one side gear part 71 and the axial force of the other side gear part 72, one side gear part 71 may be pushed toward the first friction member 81, the other surface 712 of one side gear part 71 may be tightly attached to the first friction member 81, the other side gear part 72 may be pushed toward the second friction member 82, and the other surface 722 of the other side gear part 72 may be tightly attached to the second friction member 82.

As described above, the limited differential state may be implemented by the frictional force generated when the other surface 712 of one side gear part 71 presses the first friction member 81 or the other surface 722 of the other side gear part 72 presses the second friction member 82.

According to the present invention described above, the power switching may be performed from the two-wheel drive (2WD) to the four-wheel drive (4WD). In addition, according to the present invention, when the vehicle travels on a rough road, such as a corner, a rainy road, and a snowy road, in the four-wheel drive state, one side gear part may be tightly attached to the first friction member, and the other side gear part may be tightly attached to the second friction member, such that the limited differential state may be implemented. In addition, according to the present invention, the disconnector function may improve electric power economy of the electric vehicle and perform the limited slip differential function when the vehicle turns at a high speed by applying the multi-plate clutch limited slip differential (mLSD), thereby ensuring traveling stability.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

DESCRIPTION OF REFERENCE NUMERALS

10: Casing
11: Catching projection
20: Support ring
22: Second engagement part
30: Clutch ring
31: One end
32: The other end
321: Stepped portion
33: Ring member
331: First engagement part
40: Pinion gear
50: Actuator
60: Sleeve
71: One side gear part
711: Gear portion
712: The other surface
713: One shaft portion
72: The other side gear part
721: Gear portion
722: The other surface
723: The other shaft portion
81: First friction member
82: Second friction member
B: Coupling member

What is claimed is:

1. A disconnector apparatus with a limited-slip differential, the disconnector apparatus comprising:

a casing;

a support ring disposed in the casing and configured to surround a pinion gear; and a clutch ring connected to a sleeve configured to be operated by an operation of an actuator, the clutch ring being configured to move in an engagement direction when the sleeve is operated by the actuator to engage a first engagement part, which is disposed at one end of the clutch ring positioned in the casing, with a second engagement part, which is disposed on one surface of the support ring, to implement four-wheel drive, wherein the first engagement part is disposed on one surface of a ring member directed toward the second engagement part, and the ring member is attachable to or detachable from the clutch ring, wherein the ring member is coupled to the clutch ring by a coupling member, and the coupling member penetrates one end of the clutch ring and is screw-coupled to the ring member.

2. The disconnector apparatus of claim 1, wherein a one side gear part and an other side gear part are disposed at two opposite sides of the pinion gear, respectively, wherein a gear portion of the one side gear part, which is configured to engage with the pinion gear, is disposed on one surface of the one side gear part directed toward the pinion gear, wherein a gear portion of the other side gear part, which is configured to engage with the pinion gear, is disposed on one surface of the other side gear part directed toward the pinion gear, wherein one side shaft portion extends from another surface of the one side gear part, and an other side shaft portion extends from another surface of the other side gear part.

3. The disconnector apparatus of claim 2, comprising:

a first friction member coupled to an outer-diameter portion of the one side shaft portion to be positioned between the one side gear part and the casing; and a second friction member coupled to an outer-diameter portion of the other side shaft portion to be positioned between the other side gear part and the casing.

4. The disconnector apparatus of claim 3, wherein the first friction member and the second friction member are each configured as a multi-plate clutch.

5. The disconnector apparatus of claim 4, wherein when a vehicle travels on a rough road in a four-wheel drive traveling state in which the first engagement part and the second engagement part engage with each other, the another surface of the one side gear part is configured to be tightly attached to the first friction member or the another surface of the other side gear part is configured to be tightly attached to the second friction member to implement a limited differential state.

6. The disconnector apparatus of claim 1, wherein the sleeve is coupled to an outer-diameter portion of the casing and connected to the actuator, and wherein the first engagement part is configured to engage with the second engagement part when the clutch ring connected to the sleeve is moved in the engagement direction by the operation of the actuator.

7. The disconnector apparatus of claim 1, wherein the first engagement part and the second engagement part are each configured as a dog clutch.

8. The disconnector apparatus of claim 1, wherein the clutch ring comprises:

one end positioned in the casing while penetrating the casing;

another end coupled to an outer-diameter portion of the casing to be positioned outside the casing; and a stepped portion defined on an inner-diameter portion of the another end and configured to restrict a movement of the clutch ring by being caught by a catching projection defined on the outer-diameter portion of the casing.

9. A disconnector apparatus with a limited-slip differential, the disconnector apparatus comprising:

a casing;

a support ring disposed in the casing and configured to surround a pinion gear; and a clutch ring connected to a sleeve configured to be operated by an operation of an actuator, the clutch ring being configured to move in an engagement direction when the sleeve is operated by the actuator to engage a first engagement part, which is disposed at one end of the clutch ring positioned in the casing, with a second engagement part, which is disposed on one surface of the support ring, to implement four-wheel drive, wherein the first engagement part is disposed on one surface of a ring member directed toward the second engagement part, and the ring member is attachable to or detachable from the clutch ring, wherein the clutch ring comprises:

one end positioned in the casing while penetrating the casing;

another end coupled to an outer-diameter portion of the casing to be positioned outside the casing; and a stepped portion defined on an inner-diameter portion of the another end and configured to restrict a movement of the clutch ring by being caught by a catching projection defined on the outer-diameter portion of the casing.

* * * * *